US006779668B2

(12) United States Patent
Nagler

(10) Patent No.: US 6,779,668 B2

(45) Date of Patent: Aug. 24, 2004

(54) METHOD OF AUTOMATICALLY SORTING OBJECTS AND COMBINING OBJECTS TO ASSORTMENTS

(75) Inventor: Peter Nagler, Fellbach (DE)

(73) Assignee: imt robot AG, Fellbach (DE)

(*) Notice: Subject to any disclaimer, the term of this patent is extended or adjusted under 35 U.S.C. 154(b) by 187 days.

(21) Appl. No.: 10/011,651

(22) Filed: Dec. 4, 2001

(65) Prior Publication Data

US 2002/0134710 A1 Sep. 26, 2002

(30) Foreign Application Priority Data

Dec. 4, 2000 (DE) ........................................ 100 60 348

(51) Int. Cl.[7] ............................ B07C 5/36; B65G 47/26

(52) U.S. Cl. ............. 209/617; 414/331.13; 414/331.09; 414/749.1; 198/418.1; 198/418; 198/456

(58) Field of Search ............................. 198/418, 418.1, 198/418.7, 429, 456, 458, 459.1; 414/331.13, 331.09, 331.17, 749.1, 749.5; 209/617

(56) References Cited

U.S. PATENT DOCUMENTS 3,719,020 A * 3/1973 Talbot et al. ................. 53/542
4,627,215 A * 12/1986 Walz ........................... 53/246
5,761,883 A * 6/1998 Pruett et al. .................. 53/448

FOREIGN PATENT DOCUMENTS

WO 99/28057 6/1999

* cited by examiner

*Primary Examiner*—Donald P. Walsh
*Assistant Examiner*—Jonathan R Miller
(74) *Attorney, Agent, or Firm*—Gudrun E. Huckett

(57) ABSTRACT

In a method for automated sorting of objects and combining the objects to assortments according to a selectable sorting specification, the objects are removed from a supply and an object sorting position for the objects is determined, respectively, by a control unit according to a sorting specification. The objects are placed onto a belt conveyor in an intermediate position in proximity to the object sorting position by at least one first manipulating device acting as a feeding device. The objects placed onto the belt conveyor are continuously conveyed into a working area of controllable second manipulation devices acting as placing devices arranged downstream of the feeding device. The objects are gripped by the placing device and positioned in the object sorting position determined for the objects.

15 Claims, 4 Drawing Sheets

METHOD OF AUTOMATICALLY SORTING OBJECTS AND COMBINING OBJECTS TO ASSORTMENTS

BACKGROUND OF THE INVENTION

1. Field of the Invention

The invention relates to a method for automatically sorting objects and combining objects to assortments.

2. Description of the Related Art

In known sorting methods, the objects are gripped by controllable manipulation devices and placed into trays which are transported on a belt conveyor. Each gripped object is assigned to an assortment by the manipulation device wherein the position of this assortment is determined by the control of the manipulation device. Frequently, the number of objects to be combined to an assortment or the individual weight of the objects or the total weight of an assortment are used as sorting criteria.

The prior art reference WO 99/28057 describes a method for the automated grouping of objects. The objects are placed in random order in a continuous flow onto the belt conveyor and are subsequently moved into the predetermined sorting positions by manipulation devices. The sorting positions in this known method are provided on the belt surface of the belt conveyor transporting the objects wherein a detection device arranged upstream of the manipulation devices detects the random position and orientation of the objects and submits this information to a control unit. Depending on the determined order state, the control device then determines sorting positions and controls the manipulation robot based on the sorting positions such that the robot operates with a sorting efficiency as great as possible.

In known sorting devices, a manipulation device is provided as a placing device for each object type. It picks the objects that are assigned to it and places them into a corresponding sorting position. When sorting several object types into assortments, it is therefore required to have several processing stations which in the known method usually cooperate with one another in a processing line. The manipulation devices operate in a fixed interlinked way because of the required sorting output. The automated manipulation devices of the known sorting devices are therefore fixedly configured for certain sorting tasks, and a variation of the sorting tasks can be realized only with difficulty. Retrofitting or retooling the device for changing the sorting task often entails adding a further manipulation device which leads to high costs. Moreover, in the case of sorting devices which comprise several cooperating manipulation devices, it is not always possible to achieve the maximum overall device efficiency by means of the known method for automated sorting of objects because of the required interlinking of the manipulation device which necessitates synchronization of the sorting speed of all manipulation devices. Therefore, these manipulation devices or robots must operate at a minimal speed even though, in principle, they could fulfill the assigned sorting tasks more quickly but for reasons of synchronization of the entire device they must wait for slower working robots.

SUMMARY OF THE INVENTION

It is an object of the present invention to provide a method for automated sorting of objects which makes possible a faster sorting action for variable selection of different sorting specifications.

In accordance with the present invention, this is achieved in that the objects to be sorted according to a selected sorting specification are removed from a supply and placed onto a belt conveyor and are continuously conveyed into the working area of controllable manipulation devices which are used as placing devices, where they are gripped by a placing device and are positioned in a predetermined sorting position, correlated with the respective object and determined according to the sorting specification by means of a control unit. Each object is fed onto the belt conveyer in an intermediate position close to the predetermined sorting position by a manipulation device used as a feeding device and arranged upstream of the placing device.

Each feeding device first places the objects removed from the supply in a first position onto the belt conveyor, for example, near the receiving tray. This first position, after the transport of the objects into the working area of the placing device, is close to the desired object sorting positions so that the working distances of the placing devices are short. Accordingly, the placing device can perform additional working steps at high working speed. The efficiency of the feeding devices is optimized when the objects are fed onto the belt conveyor in an arrangement similar to the group arrangement in the supply. In this connection, the feeding devices remove the objects from the supply in the form of object groups. For example, for an order state of the objects in the supply in the form of layers with a matrix arrangement, respectively, the feeding devices can remove from the supply object rows of the matrix or parts of the rows of the matrix and place them onto the belt conveyor. The objects of the supply are thus individualized during feeding onto the belt conveyor and can then be moved quickly by the placing device from their easily accessible intermediate position on the belt conveyor into the sorting positions.

When sorting several object types and when producing assortments with preselected numbers of different objects, expediently those objects of an object type having a correspondingly higher number of objects in the assortment as prescribed by the sorting specification are placed closer to the object sorting position onto the belt conveyor than the objects of the other object type(s). In this way, the robots for manipulating the object types to be handled more frequently have shorter working distances, and this results in a correspondingly higher overall speed.

Advantageously, the objects are placed onto the belt conveyor in tracks of identical object types extending in the conveying direction. The object sorting positions can be allocated approximately parallel to the objects on the belt conveyor. For sorting the objects into containers, the containers are placed in random positions continuously onto the belt, and the objects of the object type with the greatest number of objects to be sorted per container are placed directly adjacent to the container. The distances between the object groups of objects removed simultaneously from the supply and placed simultaneously onto the belt are advantageously uniform so that a periodically repeated placement pattern results corresponding to the preselected number of objects per assortment and the number of objects placed simultaneously onto the belt conveyor. The distances are selected by the control unit by taking into account the number of objects to be placed simultaneously, i.e., according to the original order state of the objects in the supply, such that the placing devices can operate with maximum possible movement speed. The control unit adjusts all feeding devices and the placing devices arranged downstream by taking into account their respective manipulation efficiencies.

The method according to the invention makes possible the disconnection of the rigid interlinking of several sorting robots in a processing line as well as the linking of the placing devices to a certain object type so that the overall efficiency of the sorting process is increased and is not limited by the individual efficiency of the manipulation device which operates the slowest. The objects can be placed in a quick feeding step simply in a formation similar to that in the supply onto the belt conveyor wherein the placement in a pattern determined by the group spacings makes possible an easy coordination of the working cycles of the placing devices. The placement pattern is determined by the control unit of the sorting device as a function of the preselected sorting specification with consideration of the respective efficiency or handling capacity of the employed manipulation devices and, correspondingly, the optimal transport speed of the belt conveyor is adjusted.

In the two-step sorting method the placing devices and the feeding devices, which are connected to one another by the belt conveyor, can be spatially separated from one another. In this way, an efficient sorting device can be installed as a modular unit in any available space.

In the two-step sorting system with feeding devices and placing devices the placement pattern is determined as a function of the preselected sorting specification such that the movement courses of the employed placing devices are optimized. When it is determined that the efficiency of a placing device is not sufficient in order to sort all concerned objects of a particular type in the case of high numbers of objects per assortment, a less utilized placing device is switched online for filling the gap. Each placing device can manipulate any of the objects to be sorted. Expediently, the placement pattern and the control of the manipulation devices is adjusted such that the placing devices are used as uniformly as possible for sorting processes which require higher sorting efficiency and for sorting processes which require less sorting efficiency.

In a preferred embodiment of the invention, by means of a detecting device, for example, a camera arrangement, arranged between the feeding devices and the placing devices, the actual position of the objects on the belt conveyor is determined and the gripping movements of the placing devices for the individual objects are corrected. In this way, slipping of individual objects during feeding onto the belt conveyor can be taken into consideration and these objects can be moved without delay in the sorting process into the predetermined assortments. Also, defective products can be detected and can be excluded from the sorting process, for example, in the case of sorting of baked goods where broken pieces are eliminated.

High efficiencies of the total arrangement can be achieved when for the determination of the placement pattern the smallest common multiple of the respective number of objects of an object type per assortment and the number of these objects for each group being fed onto the belt conveyor are calculated. Based on these values, which relate to the respective object type, the control unit determines subsequently the smallest common multiple as a number of the assortments of the placement pattern, wherein, based on this number of assortments, the total number of respective object types to be supplied for each repetition of the placement pattern is determined. Expediently, the belt distance required for this placement pattern is compared with the available working area of the placing devices. When the control unit determines that the required belt distance exceeds the available working area of the placing device, for example, in the case of high numbers of objects of an object type in comparison to the numbers of other object types to be sorted, a multi-row placement of these objects onto the belt in the object track that has been determined as too long leads to a shortening of the belt distance.

A further optimization of the sorting efficiency is achieved when the group spacings of the object groups of a placement pattern, determined for the operation of the placing devices, are adjusted to the nearest approximated value which can be achieved with the efficiency of the feeding devices, and an adjusted placement pattern can be determined by means of the thus corrected group spacings. This adjustment of the placement pattern can be realized based on the above described calculation by means of a common multiple of the factors involved. When several placement patterns with different spacings are possible, the control unit determines the maximum achievable sorting efficiency by variation of the possible placement pattern, the belt speed of the belt conveyor, the variation of the tray spacings relative to one another, and the number of the employed manipulation devices. In this connection, the placing devices can be combined in groups wherein the feeding station positions a corresponding placement pattern of the objects to be sorted onto the belt conveyor which placement pattern accommodates all placing device groups. Depending on the required sorting output, with an adjustment based on the determined optimal placement pattern, by means of a sorting device, which has several feeding devices and several placing devices, the respectively preselected sorting specification can be performed optionally with only some of the manipulation devices that are available which are individually optimally used by being operated with the method according to the invention. The sorting device can be variably used by means of the method according to the invention for most different sorting tasks wherein it is only necessary to program the robots accordingly by means of the control unit; complex constructive retooling or retrofitting is not required.

DESCRIPTION OF THE PREFERRED EMBODIMENTS

Figure 1:
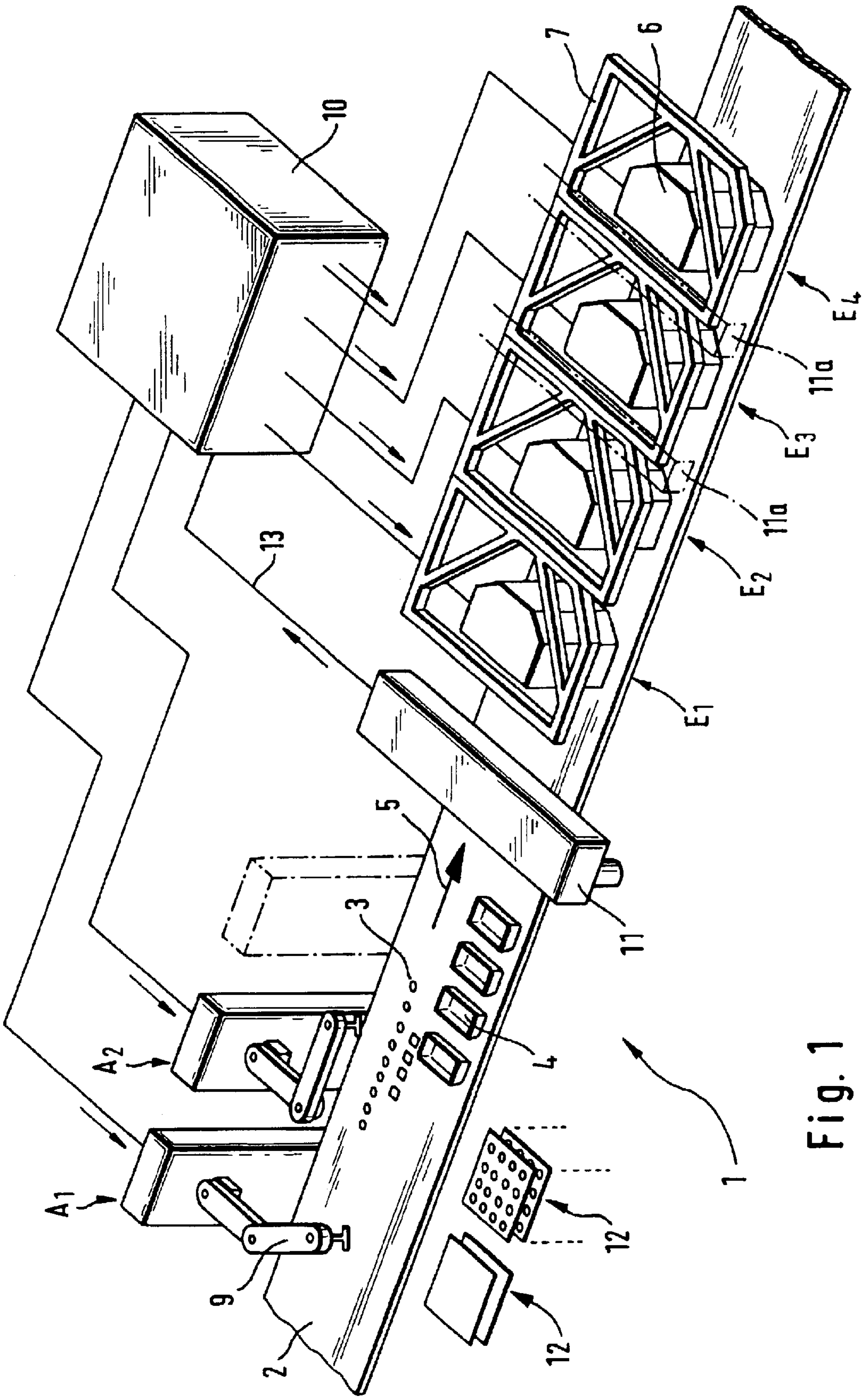
FIG. 1 is a schematic view of a sorting device.

The sorting device 1 illustrated in FIG. 1 comprises several manipulation devices $A_1$, $A_2$, $E_1$, $E_2$, $E_3$, $E_4$ for automatically combining objects of different types to individual preselected assortments. The sorting device 1 comprises moreover a belt conveyor 2 wherein the objects 3 to be sorted are placed by the feeding devices $A_1$, $A_2$, onto the belt and are transported in the transport direction 5 by the belt conveyor 2 to the second manipulation devices $E_1$, $E_2$, $E_3$, $E_4$. The second manipulation devices are individual placing devices $E_1$, $E_2$, $E_3$, $E_4$ which grip the objects 3 placed onto the belt conveyor 2 and sort them according to the preselected sorting specification into the trays or containers 4. The placing devices $E_1$, $E_2$, $E_3$, $E_4$ are comprised for this purpose substantially of a gripping robot 6 which is secured in a support frame 7 and can move within its working range into any position of the width of the belt conveyor 2. The sorting device 1 can also comprise further manipulation devices which are indicated by the additional dashed line illustration of feeding devices. The objects are removed by the feeding devices $A_1$, $A_2$ by means of gripping arms 9 from the supplies 12 and placed onto the belt conveyor 2. The feeding devices $A_1$, $A_2$ and the placing devices $E_1$, $E_2$, $E_3$, $E_4$ are controlled by a control unit 10 so as to be operatively adjusted relative to one another and coordinated with one another according to the preselected sorting specification. The control unit 10 will operate a suitable number of manipulation devices according to the required sorting efficiency and the sorting task, taking into account the sorting method according to the invention.

The objects 3 are sorted by the placing devices $E_1$, $E_2$, $E_3$, $E_4$ into the trays 4 which are placed onto the belt conveyor 2 on the predetermined sorting positions at preselected distances relative to one another and are transported together with the objects 3 to the placing devices. The objects 3 are placed in the vicinity of the sorting positions, i.e., neighboring the trays 4, onto the belt so that short working distances result for the placing devices $E_1$, $E_2$, $E_3$, $E_4$ and a quick sorting action is possible. The position and the orientation of the objects on the belt conveyor 2 is detected by an optical detection device 11. Based on the signal 13 of the detection device 11 the control unit 10 corrects the control action of the placing devices $E_1$, $E_2$, $E_3$, $E_4$ wherein also defects of individual objects can be detected. These defective goods are not gripped by the placing devices $E_1$, $E_2$, $E_3$, $E_4$ and, after passing the placing devices $E_1$, $E_2$, $E_3$, $E_4$, they will fall, for example, into a reject basket at the end of the belt conveyor 2.

In the supply 12 the objects 3 of the respective type are present in a great number in an order state which is, for example, beneficial for storing or shipping. For example, the objects 3 can be provided in several layers in a matrix-like arrangement of adjacently positioned rows. The objects 3 are placed by the feeding devices $A_1$, $A_2$ in a formation onto the belt which is similar to the order state in the supply 12 wherein several objects 3 are removed and placed simultaneously onto the belt conveyor 2. The manipulation action required for this is simple and quick. The sorting method according to the invention will be explained in the following with the aid of FIGS. 2 through 4.

Figure 3:
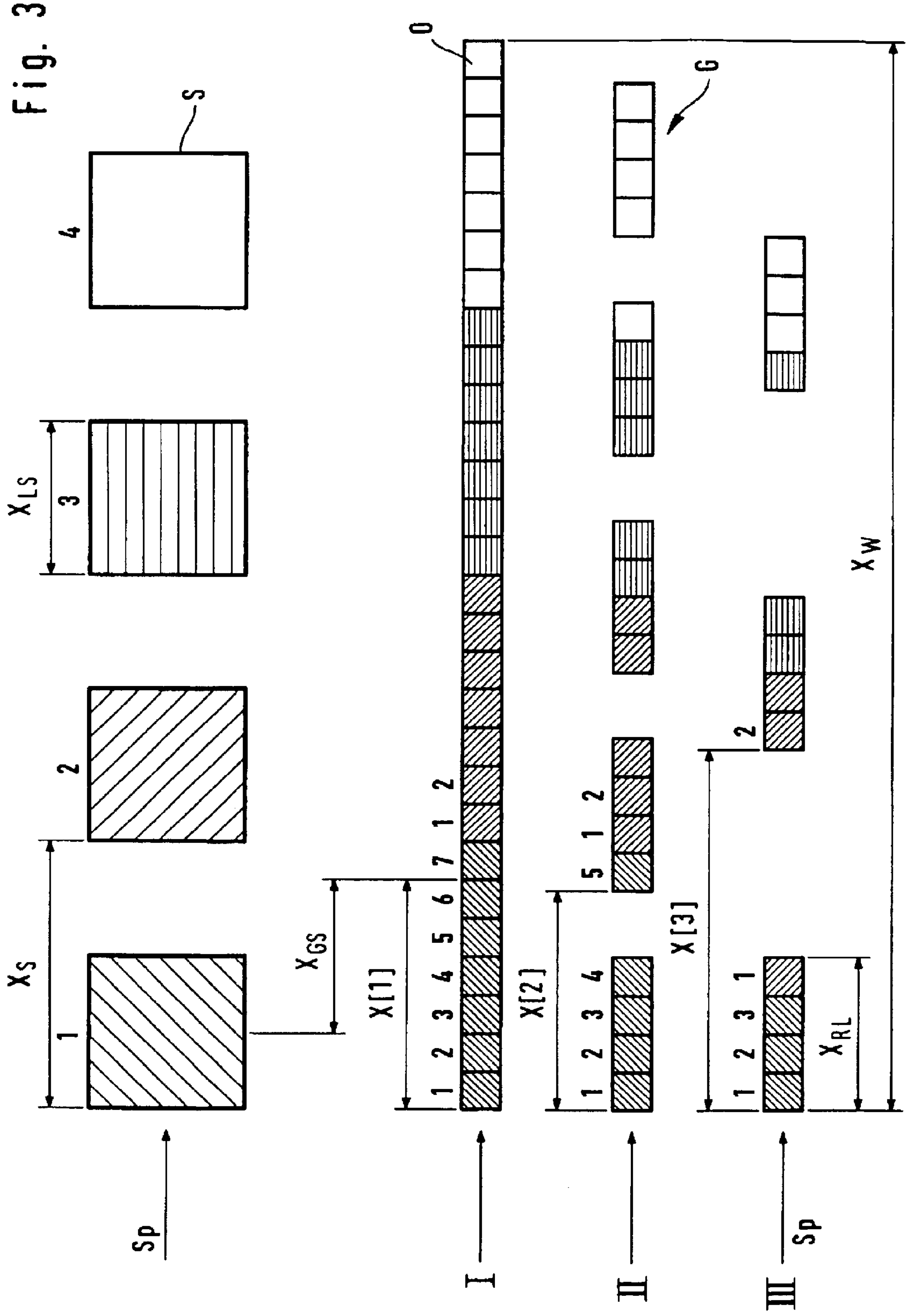
FIG. 3 is a schematic illustration of a placement pattern.

The objects to be sorted, in the present embodiment, for example, baked goods of different types, are placed by the feeding devices onto the belt 2 in tracks Sp of identical types I, II, III of baked goods wherein the tracks Sp extend in the transport direction and parallel to the trays. In this connection, according to the number of baked goods placed simultaneously onto the belt and the predetermined number of objects per tray S, a placement pattern M results which is characterized by a uniform spacing between the groups of baked goods placed simultaneously. The placement pattern illustrated in FIG. 3 is one example for sorting three types of baked goods in an assortment wherein seven pieces of the baked goods of type I, five pieces of the baked goods of the type II, and three pieces of the baked goods of the type III are to be sorted into the tray S. Shown is a complete placement pattern which is repeated periodically by adjacently positioning the respective belt distance $X_W$ required for the placement pattern. For each repetition of the placement pattern four trays are to be filled with the sorted baked goods assortment. The trays are identified with the reference numerals 1 to 4. The trays S are placed by the feeding devices onto the sorting positions which are preassigned to the sorting devices for placing the gripped objects to combine them to the respective assortments.

The control unit determines such a placement pattern which, as a function of the preselected sorting specification, optimally takes advantage of the efficiency of the employable placing devices and feeding devices and adjusts the employable manipulation devices and coordinates the movements. In this connection, the employed manipulation devices, in particular, the placing devices, are to be used as uniformly as possible for sorting processes which require a higher sorting efficiency and for sorting processes which require a lesser degree of sorting efficiency.

The products, for example, baked goods, of the same type are advantageously simultaneously placed onto the belt conveyor onto the predetermined track wherein the spacings X[1], X[2], and X[3] of the placed groups are uniform. In the present embodiment four baked goods are placed onto the belt conveyor. This value is determined according to the invention with consideration of the order state of the objects provided in the supply.

Figure 2:
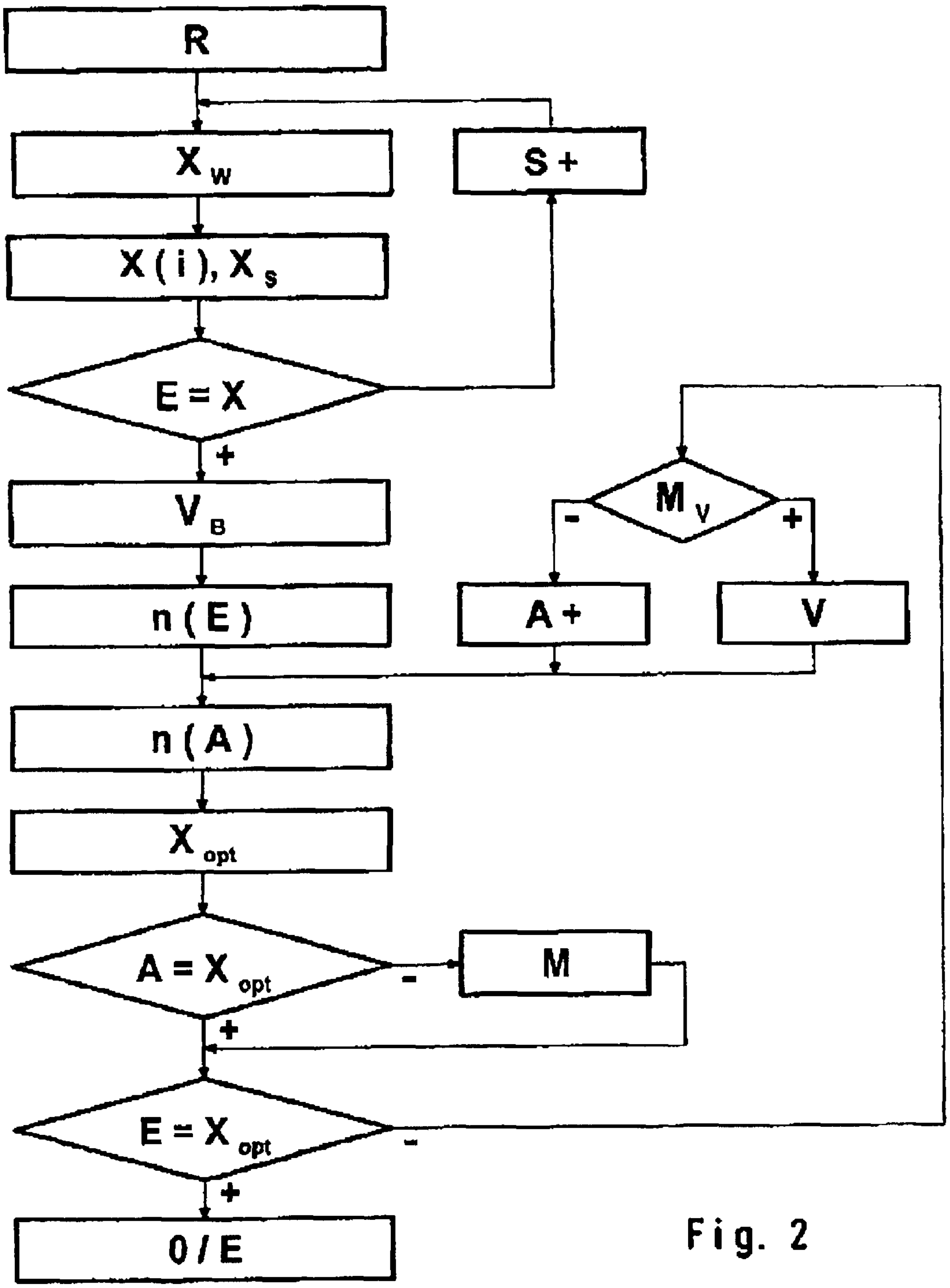
FIG. 2 is a flowchart of a sorting method according to the invention.

When determining a suitable placement pattern according to the flowchart of FIG. 2, first in the step R the entire sorting task, divided into individual manipulation steps, is distributed to the robots. In this context, according to the sorting specification a required length or distance $X_W$ of the belt is determined onto which a repetition of the placement pattern can be arranged. On this stretch of belt, pieces of baked goods of the type I, II, III are placed onto the respective tracks of the types I, II, III of baked goods in the predetermined ratio to one another, which pieces of baked goods are to be sorted later into the trays. Based on the predetermined number of objects of a type of baked goods for each assortment and the number of pieces of this type of baked goods for each group placed onto the belt, the smallest common multiple is determined. Since each type of baked goods is placed in groups G of four pieces onto the belt conveyor, this results in the smallest common multiple of 28, 20, 12 based on the sorting specifications seven pieces, five pieces, three pieces. Based on these values relating to the type of baked goods, the smallest common multiple as a number of the assortments is calculated which corresponds to the number of trays which are to be provided for each placement pattern on the belt conveyor. In the present embodiment a number of four trays thus results for each placement pattern.

Based on the spacing $X_{RL}$ of a group G for a single-row placement of the types of baked goods, a belt length $X_W$ results as an approximation value for determining the placement pattern with the condition that in any pattern repetition seven groups, i.e., 28 pieces of baked goods of the type I, are to be placed. Based on the predetermined length of the belt $X_W$ the pieces of baked goods of the type II, III which are to be provided in smaller numbers are placed at a uniform spacing from one another onto the belt. With the thus determined spacings X[i] between the groups of the individual types of baked goods and the distances $X_S$ of the trays S the control unit now determines the available working space of the placing devices and, with consideration of the possible sorting speed and sorting efficiency, it is determined whether the placing devices can operate with the initially determined spacings of the groups of baked goods in the placement pattern. The length of the belt is adjusted, if needed, by placing the pieces of baked goods in several rows on each track and the trays S can be positioned closer together on the belt conveyor in accordance with the shorter belt length; this is indicated in FIG. 2 by the labeling S+. With these new values the computing loop for the distances is performed until suitable values for the operation of the placing devices E are found, symbolized by the labeling E=X. The distances X[i] in this connection are to be kept principally smaller than the working range of a placing device which is known from the start. The control unit adjusts based on the predetermined placement pattern the belt speed $V_B$ of the belt conveyor. For this purpose, in approximation the following equation can be provided:

$$V_B = \frac{\text{efficiency} \times \text{belt length } X_W}{\text{number of trays}}$$

The belt speed is however also dependent on the number of placing devices used which, as a function of their efficiency and the predetermined sorting task, can be determined approximately based on the number of the pieces of baked goods to be handled multiplied by the efficiency and divided by the speed of the placing device:

$$\text{number of placing devices} = \frac{\sum n(i) \times \text{efficiency}}{\text{speed of placing devices}}$$

With consideration of these two equations a determination of the belt speed based on the number of provided placing devices is possible.

After the belt speed $V_B$ and the number of placing devices n(E) to be used has been calculated according to FIG. 2, the control unit determines based on the predetermined placement pattern the suitable number of feeding devices for ensuring an optimal overall sorting process. In this connection, first the placement pattern which has been determined to be optimal for the placing devices is checked and the group spacings of the pieces of baked goods provided currently in the placement pattern are adjusted to the value that is achievable with the efficiency of the feeding devices. In this connection, possible variations of the placement pattern M are checked with regard to their functionality in connection with the feeding devices, in particular, the variation with multi-row placement of the pieces of baked goods or the variation with groups being placed in several placing positions on the belt conveyor. As soon as the control unit has determined that the checked placement pattern M is not sufficient, a new variation, i.e., new spacings between the pieces of baked goods, is checked. Subsequently, the thus corrected placement pattern is checked with regard to the operational functionality of the placing devices. When in this checking step $E=X_{opt}$ it is determined that, that for the feeding devices A the optimized spacings $X_{opt}$ are not suitable for the greatest possible utilization of the placing devices, further placement patterns $M_V$ are checked. According to FIG. 2 each further available placement variant V is checked and—if no further variant is available—the number of the employed feeding devices A+ is increased. Subsequently, the distances, which are characteristic for the placement pattern and affect significantly the adjustment of the sorting robots, are checked in a computing loop alternatingly at the side of the feeding devices and of the placing devices so that an adjustment of the placing devices and the feeding devices is realized.

Taking into consideration the working area AR of each feeding device and the number of tasks of the feeding device, the group spacing $X_{opt}$ can be determined in approximation according to the following equation:

$$AR \geqq X_{opt}+X_{RL}+[(\text{number of tasks}-1)\times 2S\times V_B],$$

wherein the reaction time of the feeding devices is assumed to be two seconds. (2S). Should it not be possible to perform the placement of the pieces of baked goods with the optimal group spacings $X_1$, $X_2$, $X_3$ in a satisfactory way, the maximum possible spacing is calculated by the control unit. When in this connection one of the feeding devices takes over two tasks, i.e., two types of baked goods are handled by this feeding device, only that task is considered which has two placing positions. Inasmuch as for both sorting tasks the same number of placing positions, i.e., assortment containers, are provided, the placing position with the greatest group spacing is considered and the maximum possible spacing is calculated for it. With these spacings the predetermined placement pattern with the maximally possible spacing between the groups is determined according to the following equations:

$$X_{max1}=X_{opt}(X_{opt}+X_{RL}+[(\text{number of tasks}-1)\times(2S\times V_B)-AR)$$

$$X_{max2}=2\times X_{opt}-X_{max1}$$

After completion of checking of the determined spacings by means of the now determined group spacings $X_{opt}$ the distribution of the sorting tasks onto the placing devices that are available is carried out. With consideration of the required placing movements of the manipulation devices which results as a quotient of the total number of pieces of baked goods for each assortment and the number of the placing devices available for sorting, an adjustment of the placement pattern and the assignment of the sorting tasks onto the placing devices is carried out.

Figure 4:
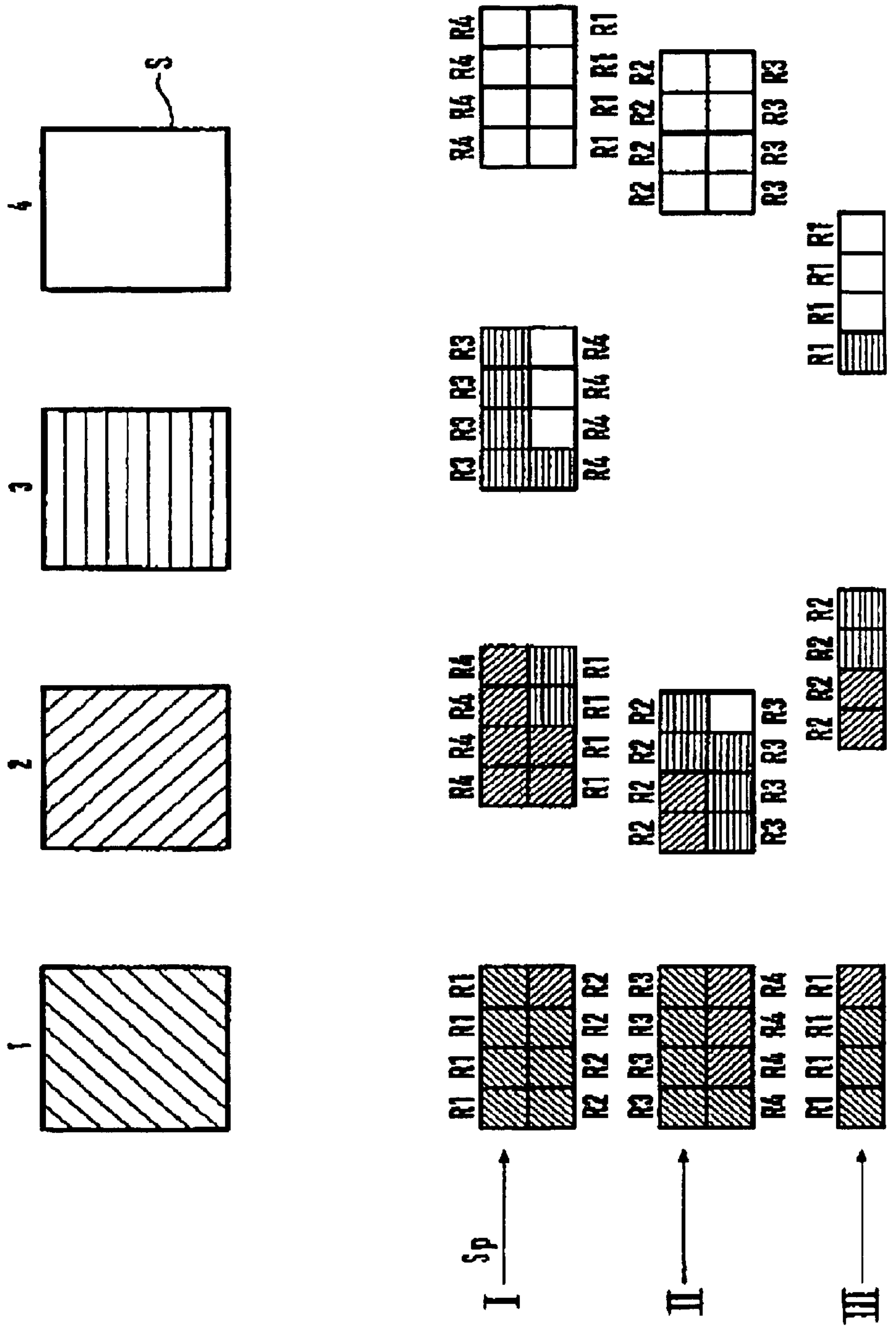
FIG. 4 is a further illustration of a placement pattern.

An advantageous placement pattern is illustrated in FIG. 4 wherein by means of a two-row placement of the pieces of baked goods in the respective tracks and the illustrated uniform distribution of four robot movements $R_1$ to $R_4$, an optimal utilization of the manipulation devices used as placing devices can be achieved.

By means of the method according to the invention objects of different types can be sorted and combined to assortments, for example, it is possible to sort automatically different types of baked goods in a predetermined number of objects into a container or a tray in which the baked goods are sold. Also, toys or craft sets can be combined in corresponding assortments or different food items which are comprised of several components. For example, by means of the method according to the invention different garnishings or side dishes can be assembled on a food production line, for example, for assembling a hamburger.

The following advantage should also be mentioned: between the placing devices additional recognition devices 11*a* can be arranged which monitor the placement result. For example, when in front of the placing device E it is determined that, for example, one object is missing in the assortment, the object can be added by the placing device E. The number of rejects of assortment trays can thus be significantly lowered.

While specific embodiments of the invention have been shown and described in detail to illustrate the inventive principles, it will be understood that the invention may be embodied otherwise without departing from such principles.

What is claimed is:

1. A method for automated sorting of objects (O, 3) and combining the objects (O, 3) to assortments according to a selectable sorting specification, the method comprising the steps of:

a) connecting at least one first manipulation device acting as a feeding device and second manipulation devices acting as placing devices to a control unit;

b) computing an object sorting position for the objects (O, 3), respectively, by the control unit (10) according to the sorting specification;

c) removing the objects (O, 3) from a supply with the feeding device and placing the objects (O, 3) with the feeding device, controlled by the control unit, onto a belt conveyor (2) in an intermediate position in proximity to the object sorting position;

d) continuously conveying the objects (O, 3) placed onto the belt conveyor (2) into a working area of the placing devices ($E_1$, $E_2$, $E_3$, $E_4$) arranged downstream of the feeding device ($A_1$, $A_2$);

e) gripping the objects (O, 3) by the placing devices ($E_1$, $E_2$, $E_3$, $E_4$) and positioning the objects (O, 3) with the placing devices, controlled by the control unit, in the object sorting position determined for the objects (O, 3).

2. The method according to claim 1, wherein in the step c) the objects (O, 3) are placed onto the belt conveyor (2) in an arrangement similar to an order state present in the supply (12), and the feeding device ($A_1$, $A_2$) removes the objects (O, 3) as object groups.

3. The method according to claim 1, further comprising the step of adjusting with the control unit (10) the at least one feeding device ($A_1$, $A_2$) and the placing devices ($E_1$, $E_2$, $E_3$, $E_4$) taking into account the handling capacity of each one of the at least feeding device ($A_1$, $A_2$) and the placing devices ($E_1$, $E_2$, $E_3$, $E_4$).

4. The method according to claim 1, further comprising the steps of: detecting at least an actual position of each one of the objects with an optical detection device (11) arranged between the at least one feeding device ($A_1$, $A_2$) and the placing devices ($E_1$, $E_2$, $E_3$, $E_4$);

sending a detection signal (13) for each one of the objects to the control unit (10); and correcting a control action of the placing devices ($E_1$, $E_2$, $E_3$, $E_4$) based on the detection signal (13).

5. The method according to claim 4, wherein the control unit (10) determines an orientation of the object (O, 3) based on the detection signal (13).

6. The method according to claim 1, wherein the objects (O, 3) are sorted according to the number of objects of the a same object type for each assortment.

7. A method for automated sorting of objects (O, 3) and combining the objects (O, 3) to assortments according to a selectable sorting specification, the method comprising the steps of:

a) removing the objects (O, 3) from a supply (12);

b) determining an object sorting position for the objects (O, 3), respectively, by a control unit (10) according to the sorting specification;

c) placing the objects (O, 3) onto a belt conveyor (2) in an intermediate position in proximity to the object sorting position by at least one first manipulating device acting as a feeding device ($A_1$, $A_2$);

d) continuously conveying the objects (O, 3) placed onto the belt conveyor (2) into a working area of controllable second manipulation devices acting as placing devices ($E_1$, $E_2$, $E_3$, $E_4$) arranged downstream of the feeding device ($A_1$, $A_2$);

e) gripping the objects (O, 3) by the placing device ($E_1$, $E_2$, $E_3$, $E_4$) and positioning the objects (O, 3) in the object sorting position determined for the objects (O, 3);

wherein in the step c) the objects (O, 3) are placed onto the belt conveyor (2) in an arrangement similar to an order state present in the supply (12), wherein in the step a) the feeding device ($A_1$, $A_2$) removes the objects (O, 3) as object groups;

wherein the objects (O, 3) are comprised of several object types (I, II, III), wherein in the step c) the objects of the object type (I) having the highest number of objects in the assortment according to the sorting specification are placed closer to the object sorting position than the objects of the object types having a lower number of objects in the assortment according to the sorting specification.

8. The method according to claim 7, wherein in step c) the object types (I, II, III) are placed, sorted by object type (I, II, III), in tracks (Sp) extending in a transport direction of the conveyor belt (2) onto the belt conveyor (2).

9. The method according to claim 8, wherein each one of the feeding devices ($A_1$, $A_2$) places the object groups of the same object type (I, II, III) simultaneously onto the track (Sp) of the object type (I, II, III), wherein a spacing between the object groups (E) of the same object type (I, II, III) is uniform.

10. The method according to claim 9, wherein the object sorting positions are arranged substantially parallel to the tracks (Sp).

11. The method according to claim 9, further comprising the step of positioning containers (4, S) on the belt conveyor at a variable spacing in the transport direction of the belt conveyor (2), wherein the object sorting positions are located in the containers (4, S), and wherein the objects are placed in the intermediate position close to the containers (4, S).

12. The method according to claim 11, further comprising the step of adjusting a transport speed of the belt conveyor (2) with the control unit (10) based on the handling capacity of the placing devices ($E_1$, $E_2$, $E_3$, $E_4$) as a function of a placement pattern (M).

13. The method according to claim 12, wherein in the step c) the objects (O, 3) are placed onto the belt conveyer (2) in a periodically repeating placement pattern (M).

14. The method according to claim 13, further comprising the step of adjusting an overall sorting efficiency with the control unit (10) by varying possible placement patterns (M), the transport speed of the belt conveyor (2), a spacing between the containers (4), and the number of the first and second manipulation devices.

15. A method for automated sorting of objects (O, 3) and combining the objects (O, 3) to assortments according to a selectable sorting specification, the method comprising the steps of:

a) removing the objects (O, 3) from a supply (12);

b) determining an object sorting position for the objects (O, 3), respectively, by a control unit (10) according to the sorting specification;

c) placing the objects (O, 3) onto a belt conveyor (2) in an intermediate position in proximity the object sorting position by at least one first manipulating device acting as a feeding device ($A_1$, $A_2$)

d) continuously conveying the objects (O, 3) placed onto the belt conveyor (2) into a working area of controllable second manipulation devices acting as placing devices ($E_1$, $E_2$, $E_3$, $E_4$) arranged downstream of the feeding device ($A_1$, $A_2$);

e) gripping the objects (O, 3) by the placing device ($E_1$, $E_2$, $E_3$, $E_4$) and positioning the objects (O, 3) in the object sorting position determined for the objects (O, 3);

f) detecting at least an actual position of each one of the objects with an optical detection device (11) arranged between the at least one feeding device ($A_1$, $A_2$) and the placing devices ($E_1$, $E_2$, $E_3$, $E_4$);

g) sending a detection signal (13) for each one of the objects to the control unit (10); and h) correcting a control action of the placing devices ($E_1$, $E_2$, $E_3$, $E_4$) based on the detection signal (13);

i) identifying with the control unit (10) based on the detection signal (13) the objects (O, 3) deviating from a prescribed quality and eliminating the objects (O, 3) deviating from a prescribed quality from further sorting.

* * * * *